United States Patent
Ludewig et al.

(10) Patent No.: US 7,700,662 B2
(45) Date of Patent: *Apr. 20, 2010

(54) PROCESS FOR PREPARING ALLOPHANATE-CONTAINING ACTINICALLY CURABLE POLYURETHANE PREPOLYMERS WITH INCREASED RESISTANCE

(75) Inventors: Michael Ludewig, Köln (DE); Jan Weikard, Odenthal-Erberich (DE); Nicolas Stoeckel, Köln (DE); Wolfgang Fischer, Meerbusch (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/731,592

(22) Filed: Mar. 30, 2007

(65) Prior Publication Data

US 2007/0232751 A1    Oct. 4, 2007

(30) Foreign Application Priority Data

Apr. 4, 2006 (DE) ........................ 10 2006 015 709

(51) Int. Cl.
C07C 275/60 (2006.01)
C07C 269/00 (2006.01)
C07C 271/62 (2006.01)
C07C 273/00 (2006.01)
C08L 75/14 (2006.01)
C08L 75/16 (2006.01)
C08G 18/42 (2006.01)
C08G 18/44 (2006.01)
C08G 18/48 (2006.01)
C08G 18/67 (2006.01)

(52) U.S. Cl. .............. 522/90; 252/182.18; 522/96; 522/97; 522/174; 525/123; 525/124; 525/125; 525/126; 525/127; 525/130; 525/453; 525/455; 525/457; 525/458; 525/460; 526/301; 526/302; 528/45; 528/49; 528/59; 528/69; 528/75; 528/76; 528/80; 528/85; 564/44; 564/45; 564/46

(58) Field of Classification Search ............... 522/90, 522/96, 97, 174; 525/123, 124, 125, 126, 525/127, 130, 453, 455, 457, 458, 460; 526/301, 526/302; 528/45, 49, 59, 69, 75, 76, 80, 528/85; 564/44, 45, 46
See application file for complete search history.

(56) References Cited

U.S. PATENT DOCUMENTS

| | | | |
|---|---|---|---|
| 5,596,065 A | 1/1997 | Gerlitz et al. | 528/71 |
| 5,739,251 A * | 4/1998 | Venham et al. | 528/49 |
| 5,917,083 A | 6/1999 | König et al. | 560/157 |
| 6,392,001 B1 | 5/2002 | Mertes et al. | 528/59 |
| 6,617,413 B1 | 9/2003 | Bruchmann et al. | 528/75 |
| 7,361,723 B2 * | 4/2008 | Detrembleur et al. | 528/48 |
| 7,381,785 B2 * | 6/2008 | Detrembleur et al. | 528/48 |
| 2003/0153713 A1 | 8/2003 | Spyrou et al. | 528/48 |
| 2005/0209361 A1 | 9/2005 | Detrembleur et al. | |
| 2005/0209427 A1* | 9/2005 | Detrembleur et al. | 528/44 |
| 2005/0222365 A1 | 10/2005 | Mager et al. | 528/73 |
| 2005/0222366 A1 | 10/2005 | Mager et al. | 528/73 |
| 2006/0079660 A1 | 4/2006 | Ludewig et al. | 528/44 |
| 2006/0205911 A1 | 9/2006 | Ludewig et al. | 528/44 |

FOREIGN PATENT DOCUMENTS

| | | |
|---|---|---|
| DE | 102004012902 | 10/2005 |
| GB | 994890 | 6/1965 |
| JP | 61243815 | 10/1986 |

* cited by examiner

*Primary Examiner*—Rabon Sergent
(74) *Attorney, Agent, or Firm*—Connolly Bove Lodge & Hutz LLP

(57) ABSTRACT

The present invention relates to a process for preparing low-viscosity, allophanate-containing and NCO-free polyurethane prepolymers curable by actinic radiation, and to the products obtainable by this process. The prepolymers have residual monomer contents of less than 0.5% by weight and an NCO content of less than 1% by weight, and are prepared by a process in which A) diisocyanates, B) hydroxy-functional compounds containing groups which react with ethylenically unsaturated compounds on exposure to actinic radiation, and C) polyester, polyether or polycarbonate polyols having a functionality of at least 1.9 and a number-average molecular weight ($M_n$) of at least 1000 g/mol, D) optionally in the presence of a catalyst, are reacted to form NCO-group-containing prepolymers having radiation-curing groups, which are subsequently reacted E) optionally after addition of monofunctional isocyanates in the presence F) of an allophanatization catalyst to give allophanate-containing prepolymers, the ratio of NCO groups of the compounds from A) to the OH groups of the compounds from B) and C) being 1.45:1.0 to 1.1:1.0 and the ratio of the OH groups from B) to the OH groups from C) being 8.0:1 to 1.5:1.

12 Claims, No Drawings

PROCESS FOR PREPARING ALLOPHANATE-CONTAINING ACTINICALLY CURABLE POLYURETHANE PREPOLYMERS WITH INCREASED RESISTANCE

CROSS-REFERENCE TO RELATED APPLICATION

This application claims priority under 35 U.S.C. §119 (a-d) to German application DE 102006 015709.5, filed Apr. 4, 2006.

FIELD OF THE INVENTION

The present invention relates to a simple process for preparing low-viscosity, allophanate-containing and NCO-free polyurethane prepolymers of enhanced functionality that are curable by means of actinic radiation, and also to the products obtainable by this process and to their use as particularly resistant and elastic film-forming binders.

BACKGROUND OF THE INVENTION

The curing of coating systems which carry activated double bonds by actinic radiation, such as UV light, IR radiation or else electron beams, is known and is established in industry. It is one of the most rapid curing methods in coating technology. Coating compositions based on this principle are referred to as radiation- or actinic-curing or -curable systems.

Very simple, flexible urethane acrylate prepolymers can be prepared by reacting NCO prepolymers based on a polyester, polyether or polycarbonate polyol with an OH-functional compounds containing activated double bonds, such as hydroxyalkyl acrylates, for example (P. K. T. Oldring (Ed.): Vol. 2 "Prepolymers and Reactive Diluents for UV and EB Curable Formulations", 1991, p105ff). Depending on the nature and the molecular weight of the polyol used it is entirely possible in this case for very flexible and elastic binders to form that are curable by actinic radiation. A disadvantage here, however, is the typically high viscosity of such systems, which frequently necessitates the use of reactive diluents. Moreover, with a very high molecular weight, such systems are not of very high functionality, which impacts adversely on the reactivity and the resistance towards solvents.

A significant advantage in terms of viscosity is offered by systems of the kind described in, for example, the European application with the application number 06004171.2. There the urethane groups present in the prepolymer are reacted with monoisocyanates to form allophanates, which significantly lowers the viscosity of the binders. The problem of the low functionality and hence low resistance, however, is not addressed.

On the other hand, however, the method of allophanatization as described in GB 994,890 or EP 682 012, for example, is entirely suitable for raising the functionality of a binder. Applications WO 2005/097737 or WO 2005/097865, for example, describe prepolymers based on difunctional polyethers which are reacted by urethanization and subsequent allophanatization to give tetra-functional NCO prepolymers. A further reaction with hydroxyalkylacrylates would lead, however, to a very awkward operation with little advantage, which as well as two separate reaction procedures would also involve distillation of the excess diisocyanate.

It is likewise possible to react an acrylate-containing and NCO-containing allophanate, as described in EP 1 144 476 B1, in an additional step with further hydroxyalkyl (meth) acrylate and a polyester, polyether or polycarbonate polyol.

Although this procedure again gives the polyfunctional prepolymers described above, it produces a saving in terms neither of the distillation of the products nor of one of the two reaction procedures. In addition, this operation harbours the difficulty that the distillation step must take place at temperatures up to 135° C. in order to allow the residual isocyanate content to be lowered sufficiently (<0.5% by weight residual monomer). There is a risk that, even during the purifying operation, double bonds will react under thermal initiation in polymerization, with the consequence that ideal products are no longer obtained.

It is also possible to prepare allophanates indirectly, from isocyanate derivatives other than urethanes and isocyanates. For instance EP-A 0 825 211 describes a process for building up allophanate structures from oxadiazinetriones; a further route is the opening of uretdiones (cf. Proceedings of the International Waterborne, High-Solids, and Powder Coatings Symposium 2001, 28$^{th}$, 405-419 and also US-A 2003 0153713) to give allophanate structures. In both cases the use of polyester, polyether or polycarbonate polyols leads either to the ring opening or to the target products even at the urethanization stage. Both routes, however, require high-grade raw materials as their starting material and lead only to an allophanate product which is rich in by-products.

EP-B 694 531 describes a multi-stage process for preparing hydrophilicized allophanates containing radiation-curing groups. In that case, however, first an NCO- and acrylate-functional urethane is prepared, which is hydrophilicized and subsequently allophanatized following addition of a further NCO- and acrylate-functional urethane. As the process temperature for the allophanatization, very high temperatures of 100 to 110° C. are specified, which may lead to an unwanted free-radical polymerization.

In the European application with the application number 05020859.4 a process has now been described that allows the preparation of radiation-curing, allophanate-containing binders based on easily available raw materials, such as polyisocyanates and polyols, in an operation already at a moderate temperature of below 100° C. without a distillation step. The coatings produced from these coating materials are very hard, but their elasticity and solvent resistance are each in need of improvement.

SUMMARY OF THE INVENTION

It was an object of the present invention, therefore, to provide actinically curable binders which lead to coatings whose properties are improved in respect of their elasticity and resistance towards solvents.

It has now been found that, starting from the radiation-curing, allophanate-containing binders described in the European application with the application number 05020859.4, products which meet these requirements are obtained when specific polyols are employed in the synthesis of the binders.

The invention accordingly provides a process for preparing radiation-curing allophanate-containing prepolymers having residual monomer contents of less than 0.5% by weight and an NCO content of less than 1% by weight, wherein A) diisocyanates,
B) hydroxy-functional compounds which contain groups which react, with polymerization, with ethylenically unsaturated compounds on exposure to actinic radiation (radiation-curing groups) and C) polyester, polyether or polycarbonate polyols having a functionality of at least 1.9 and a number-average molecular weight ($M_n$) of at least 1000 g/mol
D) optionally in the presence of a catalyst are used to form NCO-group-containing prepolymers having radiation-curing groups, which are subsequently reacted
E) optionally after addition of monofunctional isocyanates in the presence
F) of an allophanatization catalyst to give allophanate-containing prepolymers, the ratio of NCO groups of the compounds from A) to the OH groups of the compounds from B) and C) being 1.45:1.0 to 1.1:1.0 and the ratio of the OH groups from B) to the OH groups from C) being 8.0:1 to 1.5:1.

Further provided by the invention are the binders obtainable by the process of the invention.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

The ratio of NCO groups of the compounds from A) to the OH groups of the compounds from B) and C) is preferably 1.43:1.0 to 1.2:1.0, more preferably 1.35:1.0 to 1.3:1.0.

The ratio of the OH groups from B) to the OH groups from C) is preferably 5.0:1 to 2.0:1.

Suitable diisocyanates A) include aromatic, aliphatic and cycloaliphatic diisocyanates. Suitable diisocyanates are compounds of the formula Q(NCO)$_2$ having an average molecular weight below 800 g/mol, in which Q is an aromatic $C_6$-$C_{15}$ hydrocarbon radical, an aliphatic $C_4$-$C_{12}$ hydrocarbon radical or a cycloaliphatic $C_6$-$C_{15}$ hydrocarbon radical. Suitability is possessed for example by diisocyanates from the series consisting of 2,4-/2,6-toluene diisocyanate (TDI), methylenediphenyl diisocyanate (MDI), naphthyl diisocyanate (NDI), 4,4'-diisocyanatodicyclohexyl-methane, 3-isocyanatomethyl-3,3,5-trimethylcyclohexyl isocyanate (isophorone diisocyanate=IPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanato-2,2-dicyclohexylpropane, 3-isocyanatomethyl-1-methyl-1-isocyanatocyclohexane (MCI), 1,3-diisooctylcyanato-4-methylcyclohexane, 1,3-diisocyanato-2-methyl-cyclohexane and α,α,α',α'-tetramethyl-m- or -p-xylylene diisocyanate (TMXDI) and also mixtures consisting of these compounds.

Likewise suitable as isocyanate-containing compounds A) are reaction products of the aforementioned isocyanates with themselves or with one another to form uretdiones. Mention may be made by way of example of Desmodur® N3400 (Bayer MaterialScience, Leverkusen, DE).

Preference is given as component A) to the use of monomeric diisocyanates. Very particular preference is given to using hexamethylene diisocyanate (HDI), isophorone diisocyanate (IPDI) and/or 4,4'-diisocyanatodicyclohexyl methane.

By actinic radiation is meant electromagnetic, ionizing radiation, especially electron beams, UV radiation and also visible light (Roche Lexikon Medizin, 4th edition; Urban & Fischer Verlag, Munich 1999).

Groups which react, with polymerization, with ethylenically unsaturated compounds on exposure to actinic radiation (radiation-curing groups) are for the purposes of the present invention vinyl ether, maleyl, fumaryl, maleimide, dicyclopentadienyl, acrylamide, acrylic and methacrylic groups, preference being given to vinyl ether, acrylate and/or methacrylate groups, more preferably acrylate groups.

Examples of suitable hydroxyl-containing compounds of component B) are 2-hydroxyethyl (meth)acrylate, polyethylene oxide mono(meth)acrylate (e.g. PEA6/PEM6; Laporte Performance Chemicals Ltd., UK), polypropylene oxide mono(meth)acrylate (e.g. PPA6, PPM5S; Laporte Performance Chemicals Ltd., UK), polyalkylene oxide mono(meth)acrylate (e.g. PEM63P, Laporte Performance Chemicals Ltd., UK), poly(ε-caprolactone) mono(meth)acrylates such as Tone M100® for example (Dow, Schwalbach, DE), 2-hydroxypropyl (meth)acrylate, 4-hydroxybutyl (meth)acrylate, hydroxybutyl vinyl ether, 3-hydroxy-2,2-dimethylpropyl (meth)acrylate, the hydroxy-functional mono-, di- or where possible higher acrylates such as, for example, glyceryl di(meth)acrylate, trimethylolpropane di(meth)acrylate, pentaerythritol tri(meth)acrylate or dipentaerythritol penta(meth)acrylate, which are obtainable by reacting polyhydric, optionally alkoxylated alcohols such as trimethylolpropane, glycerol, pentaerythritol, dipentaerythritol.

Likewise suitable as a constituent of B) as well are alcohols obtained from the reaction of acids containing double bonds with epoxide compounds optionally containing double bonds, such as, for example, the reaction products of (meth) acrylic acid with glycidyl (meth)acrylate or bisphenol A diglycidyl ether.

Additionally it is likewise possible to use unsaturated alcohols which are obtained from the reaction of optionally unsaturated acid anhydrides with hydroxy compounds and epoxide compounds that optionally contain acrylate groups. By way of example these are the reaction products of maleic anhydride with 2-hydroxyethyl (meth)acrylate and glycidyl (meth)acrylate.

With particular preference the compounds of component B) correspond to the aforementioned kind and have an OH functionality of from 0.9 to 1.1.

Preference is given to the use of hydroxyethyl (meth)acrylate, hydroxypropyl (meth)acrylate and/or hydroxybutyl (meth)acrylate. Very particular preference is given to hydroxyethyl acrylate and/or hydroxypropyl acrylate.

Besides the OH-functional unsaturated compounds of component B) it is possible as well in the process of the invention to use polyether, polyester or polycarbonate as compounds C) which have an average molecular weight $M_n$ of at least 1000 g/mol and an OH functionality of at least 1.9.

It is preferred to use polyether diols, polyester diols and polycarbonate diols which have a functionality of 1.9 to 2.1 and a number-average molecular weight of 1000 to 4000 g/mol. Particular preference is given to polyether diols and polyester diols having a functionality of 1.95 to 2.0 and a number-average molecular weight of 1000 to 2000 g/mol.

Suitable polyether diols are the polyethers customary in polyurethane chemistry, such as the addition compounds or mixed addition compounds, prepared using starter molecules with a valency of two such as water or the below-mentioned diols or amines containing 1- to 2-NH bonds, of tetrahydrofuran, styrene oxide, ethylene oxide, propylene oxide, the butylene oxides or epichlorohydrin, particularly those of ethylene oxide and/or of propylene oxide. Preference is given to propylene oxide polyethers, which can contain up to 50% by weight of incorporated polyethylene oxide units.

Suitable low molecular weight starter molecules which can be used for such polyethers are diols customary in polyurethane chemistry, having molecular weights of 62 to 399, such as ethylene glycol, triethylene glycol, tetraethylene glycol, propanediol-1,2 and -1,3, butanediol-1,4 and -1,3, hexanediol-1,6, octanediol-1,8, neopentyl glycol, 1,4-bis(hydroxymethyl)cyclohexane, bis(hydroxyl-methyl)tricyclo [5.2.1.0$^{2,6}$]decane or 1,4-bis(2-hydroxyethoxy)benzene, 2-methyl-1,3-propanediol, 2,2,4-trimethylpentanediol, 2-ethyl-1,3-hexanediol, dipropylene glycol, polypropylene glycols, dibutylene glycol, polybutylene glycols, bisphenol A, tetrabromobisphenol A.

It is conceivable in this context to use not only conventional polyethers, prepared on the basis of catalysis with potassium hydroxide, for example, but also those polyethers which are prepared with the newer processes based on the double metal cyanide catalysts. Latter polyethers generally have a particularly low level of terminal unsaturation, of less than 0.07 meq/g, contain significantly less monols, and generally have a low polydispersity of less than 1.5.

Examples of suitable polyester polyols include reaction products of dihydric alcohols with dibasic carboxylic acids. In lieu of the free dicarboxylic acids it is also possible to use the corresponding dicarboxylic anhydrides or corresponding dicarboxylic esters of lower alcohols or mixtures thereof for preparing the polyesters. The dicarboxylic acids may be aliphatic, cycloaliphatic aromatic and/or heterocyclic in nature and may where appropriate be substituted, by halogen atoms for example, and/or unsaturated. By way of example mention is made of adipic acid, phthalic acid, isophthalic acid, succinic acid, suberic acid, azelaic acid, sebacic acid, phthalic anhydride, tetrahydrophthalic anhydride, glutaric anhydride, tetrachlorophthalic anhydride, endomethylene tetrahydrophthalic anhydride, maleic anhydride, maleic acid, fumaric acid, dimeric fatty acids such as oleic acid; dimethyl terephthalate or bis-glycol terephthalate. Preference is given to hydroxy polyesters which melt at below 60° C.

The polycarbonate diols that come into consideration are obtainable by reacting carbonic acid derivatives, e.g. diphenyl carbonate, dimethyl carbonate or phosgene, with diols. Examples of suitable such diols include ethylene glycol, triethylene glycol, tetraethylene glycol, propane-1,2-diol and -1,3-diol, butane-1,4-diol and -1,3-diol, pentane-1,5-diol, hexane-1,6-diol, octane-1,8-diol, neopentyl glycol, 1,4-bis (hydroxymethyl)cyclohexane, bis(hydroxymethyl)tricycle [5.2.1.0$^{2,6}$]decane or 1,4-bis(2-hydroxyethoxy)benzene, 2-methyl-1,3-propanediol, 2,2,4-trimethylpentanediol, dipropylene glycol, polypropylene glycols, dibutylene glycol, polybutylene glycols, bisphenol A and tetrabromobisphenol A, or mixtures of said diols. The diol component preferably receives 40% to 100% by weight of hexanediol, preferably hexane-1,6-diol, and/or hexanediol derivatives, preferably those which in addition to terminal OH groups contain ether groups or ester groups, examples being products obtained by reacting 1 mol of hexanediol with at least 1 mol, preferably 1 to 2 mol, of caprolactone in accordance with DE-A 1 770 245, or by etherifing hexanediol with itself to give the di- or trihexylene glycol. The preparation of such derivatives is known for example from DE-A 1 570 540. The polyether-polycarbonate diols described in DE-A 3 717 060 can also be used to very good effect.

Suitable compounds of the catalyst component D) include urethanization catalysts that are known per se to the skilled person, such as organotin compounds or aminic catalysts. Organotin compounds that may be mentioned by way of example include the following: dibutyltin diacetate, dibutyltin dilaurate, dibutyltin bis -acetoacetonate and tin carboxylates such as tin octoate, for example. The tin catalysts mentioned may optionally be used in combination with aminic catalysts such as aminosilanes or 1,4-diazabicyclo[2.2.2]octane.

With particular preference dibutyltin dilaurate is used as urethanization catalyst in D).

In the process of the invention the catalyst component D), if used at all, is employed in amounts of 0.001% to 5.0% by weight, preferably 0.001% to 0.1% by weight and more preferably 0.005% to 0.05% by weight, based on solids content of the process product.

Compounds used as component E) are monoisocyanates of the general formula R-NCO, R preferably being an alkyl radical having 1 to 20 carbon atoms or aryl radical having 6 to 20 carbon atoms, it being possible for the said alkyl or aryl radicals to have other functional groups in addition to the NCO function, subject to the proviso that these other functional groups are neither isocyanate groups nor have structures derived from NCO groups.

Examples of suitable monoisocyanates are methyl isocyanate, isopropyl isocyanate, n-butyl isocyanate, tert-butyl isocyanate, n-hexyl isocyanate, cyclohexyl isocyanate, stearyl isocyanate, phenyl isocyanate (including chlorinated forms), 1-naphthyl isocyanate, tolyl isocyanate (metha, para and ortho form, including fluorinated and chlorinated forms), p-isopropylphenyl isocyanate, 2,6-diisopropylphenyl isocyanate and p-toluenesulphonyl diisocyanate. Preferred monoisocyanates are n-butyl or n-hexyl isocyanate.

The monoisocyanate used for allophanate formation can be used substoichiometrically or equimolarly with respect to the urethane groups of the starting compound that are formed in the first step. If monoisocyanates are used, it is preferred to use 0.1 to 1.0 mol of monoisocyanate per 1.0 mol of urethane groups formed in the first step, particular preference being given to the use of 0.5 to 1.0 mol of monoisocyanate.

As catalyst F) it is possible to use allophanatization catalysts that are known per se to the skilled person, such as the zinc salts zinc octoate, zinc acetylacetonate and zinc 2-ethylcaproate, or tetraalkylammonium compounds, such as N,N,N-trimethyl-N-2-hydroxypropylammonium hydroxide, N,N,N-trimethyl-N-2-hydroxypropylammonium 2-ethylhexanoate or choline 2-ethylhexanoate. Preference is given to the use of the tetraalkylammonium compounds or of zinc octoate, more preferably that of choline 2-ethylhexanoate or zinc octoate as allophanatization catalyst.

The allophanatization catalyst is used in amounts of 0.001% to 5.0% by weight, preferably 0.001% to 2.0% by weight and more preferably 0.05% to 0.5% by weight based on solids content of the process product.

In principle it is possible to use the allophanatization catalyst F) even for the urethanization reaction in D) and to simplify the two-stage procedure into a one-stage reaction. However, this is not preferred, and so the allophanatization catalyst is not added until all or a proportion of the urethane groups are to be reacted to allophanate groups.

The catalyst F) can be added in a portion all at once or else in a number of portions or else continuously. Preference is given to portionwise or continuous addition, in order to avoid temperature peaks and consequent unwanted polymerization reactions of the radiation-curing groups.

The reaction of allophanatization is preferably carried out until the NCO content of the product is below 0.5% by weight, more preferably below 0.3% by weight.

It is possible in principle to react a residual NCO group content with NCO-reactive compounds such as alcohols, for example, after the end of the allophanatization reaction. This gives products having especially low NCO contents.

It is also possible to apply the catalysts D) and/or F) to support materials by methods known to the skilled person and to use them as heterogeneous catalysts.

In the process of the invention it is possible to make use optionally at any desired point of solvents or reactive diluents.

Suitable solvents are inert towards the functional groups present in the process product from the time of their addition up to the end of the process. Suitable solvents are, for example, those used in the paint industry, such as hydrocarbons, ketones and esters, e.g. toluene, xylene, isooctane, acetone, butanone, methyl isobutyl ketone, ethyl acetate, butyl acetate, tetrahydrofuran, N-methylpyrrolidone, dimethylacetamide and dimethylformamide, though it is preferred not to add any solvent.

As reactive diluents it is possible to use compounds which in the course of UV curing are likewise (co)polymerized and hence incorporated into the polymer network and are inert towards NCO groups. Such reactive diluents are described exemplarily in P. K. T. Oldring (Ed.), Chemistry & Technology of UV & EB Formulations For Coatings, Inks & Paints, Vol. 2, 1991, SITA Technology, London, pp. 237-285. They may be esters of acrylic acid or methacrylic acid, preferably of acrylic acid, with mono- or polyfunctional alcohols. Examples of suitable alcohols include the isomeric butanols, pentanols, hexanols, heptanols, octanols, nonanols and decanols, and also cycloaliphatic alcohols such as isobornol, cyclohexanol and alkylated cyclohexanols, dicyclopentanol, aryl-aliphatic alcohols such as phenoxyethanol and nonylphenylethanol, and tetrahydrofurfuryl alcohols. Additionally it is possible to use alkoxylated derivatives of these alcohols. Suitable dihydric alcohols are, for example, alcohols such as ethylene glycol, propane-1,2-diol, propane-1,3-diol, diethylene glycol, dipropylene glycol, the isomeric butanediols, neopentyl glycol, hexane-1,6-diol, 2-ethylhexanediol and tripropylene glycol or else alkoxylated derivatives of these alcohols. Preferred dihydric alcohols are hexane-1,6-diol, dipropylene glycol and tripropylene glycol. Suitable trihydric alcohols are glycerol or trimethylolpropane or their alkoxylated derivatives. Tetrahydric alcohols are pentaerythritol or its alkoxylated derivatives.

The binders of the invention must be stabilized against premature polymerization. Therefore, as a constituent of component A) or B), before and/or during the reaction, stabilizers are added which inhibit the polymerization. Use is made in this context preferably of phenothiazine. Possible other stabilizers are phenols such as para-methoxyphenyl, 2,5-di-tert-butylhydroquinone or 2,6-di-tert-butyl-4-methylphenol. Also suitable are N-oxyl compounds for stabilization, such as 2,2,6,6-tetramethylpiperidine N-oxide (TEMPO), for example, or its derivatives. The stabilizers can also be incorporated chemically into the binder; suitability in this context is possessed by compounds of the abovementioned classes, especially if they still carry further free aliphatic alcohol groups or primary or secondary amine groups and hence can be attached chemically to compounds of component A) by way of urethane or urea groups. Particularly suitable for this purpose are 2,2,6,6-tetramethyl-4-hydroxypiperidine N-oxide.

Other stabilizers, such as compounds from the class of the HALS (HALS=hindered amine light stabilizers), in contrast, are used less preferably, since they are known not to enable such effective stabilization and instead may lead to "creeping" free-radical polymerization of unsaturated groups.

The stabilizers are to be chosen such that they are stable under the influence of the catalysts D) and F) and do not react with a component of the process of the invention under the reaction conditions. This can lead to a loss of the stabilizing property.

In order to stabilize the reaction mixture, in particular the unsaturated groups, against premature polymerization it is possible to pass an oxygen-containing gas, preferably air, into and/or over the reaction mixture. It is preferred for the gas to have a very low moisture content, in order to prevent unwanted reactions in the presence of isocyanate.

In general a stabilizer is added during the preparation of the binders of the invention, and at the end, in order to achieve a long-term stability, stabilization is repeated with a phenolic stabilizer, and optionally the reaction product is saturated with air.

In the process of the invention the stabilizer component is used typically in amounts of 0.001% to 5.0% by weight, preferably 0.01% to 2.0% by weight and more preferably 0.05% to 1.0% by weight, based on the solids content of the process product.

The process of the invention is carried out at temperatures of not more than 100° C., preferably of 20 to 100° C., more preferably of 40 to 100° C., in particular at 60 to 90° C.

It is immaterial whether one or both stages of the process of the invention is or are carried out continuously in, for example, a static mixer, extruder or compounder or batchwise in, for example, a stirred reactor.

Preferably the process of the invention is carried out in a stirred reactor.

The course of the reaction can be monitored by means of suitable measuring instruments installed in the reaction vessel and/or on the basis of analyses on samples taken. Suitable techniques are known to the skilled person. They include, for example, viscosity measurements, measurements of the NCO content, of the refractive index, of the OH content, gas chromatography (GC), nuclear magnetic resonance spectroscopy (NMR), infrared spectroscopy (IR) and near infrared spectroscopy (NIR). Preference is given to IR checking for free NCO groups present (for aliphatic NCO groups, band at approximately $v=2272$ $cm^{-1}$) and to GC analyses for unreacted compounds from A), B) and, where used, C).

The unsaturated allophanate-containing prepolymers obtainable by the process of the invention, especially those based on the HDI employed with preference, preferably have number-average molecular weights $M_n$ of 1500 to 5000 g/mol, more preferably 2000 to 4000 g/mol.

The unsaturated allophanate-containing prepolymers obtainable by the process of the invention preferably contain less than 0.5% by weight of free diisocyanate monomers, more preferably less than 0.1% by weight.

The invention further provides for the use of the prepolymers of the invention in the preparation of coatings, coating materials, adhesives, sealants and printing inks. Preference is given here to their use in coating materials and coatings. Particular preference is given to use in coatings for plastics and metals.

The invention further provides coating compositions comprising a) one or more of the radiation-curing allophanate-containing prepolymers of the invention, b) optionally one or more polyisocyanates containing free or blocked isocyanate groups, which are free from groups which react, with polymerization, with ethylenically unsaturated compounds on exposure to actinic radiation, c) optionally other compounds, different from those of a), which contain groups which react, with polymerization, with ethylenically unsaturated compounds on exposure to actinic radiation, and optionally contain free or blocked NCO groups, d) optionally one or more isocyanate-reactive compounds containing active hydrogen,
e) optionally initiators and
f) optionally auxiliaries and additives.

The invention further provides for the use of the coating compositions of the invention comprising the unsaturated allophanate-containing prepolymers obtainable by the process of the invention in coating materials, adhesives, sealants and printing inks. Particular preference is given here to the use of the binders of the invention for coating plastics and metals.

The invention further provides the objects and substrates coated with the coating compositions of the invention.

The polyisocyanates of component b) are known per se to the skilled person. Preference is given here to using compounds optionally modified with isocyanurate, allophanate, biuret, uretdione and/or iminooxadiazinetrione groups and based on hexamethylene diisocyanate, isophorone diisocyanate, 4,4'-diisocyanatodicyclohexyl methane and/or trimethylhexamethylene diisocyanate.

The NCO groups in this case may also be blocked.

The compounds of component c) include compounds such as, in particular, urethane acrylates based preferably on hexamethylene diisocyanate, isophorone diisocyanate, 4,4'-diisocyanatodicyclohexyl methane and/or trimethylhexamethylene diisocyanate, which optionally may have been modified with isocyanurate, allophanate, biuret, uretdione and/or iminooxadiazinetrione groups, and which contain no isocyanate-group-reactive functions containing active hydrogen.

NCO-containing urethane acrylates are available commercially from Bayer AG, Leverkusen, DE as Desmolux® VP LS 2337, VP LS 2396 or XP 2510. An NCO-containing allophanate urethane acrylate is available from BASF AG, Ludwigshafen, DE as Laromer® 9000.

Additionally the reactive diluents already described and known in the art of radiation-curing coatings may be used as a constituent of c), provided that they do not contain any NCO-reactive groups.

Compounds of component d) can be saturated or unsaturated. Chemical functionalities reacting with NCO groups are functionalities containing activated hydrogen atoms, such as hydroxyl, amine or thiol.

Preference is given to saturated polyhydroxy compounds, examples being the polyether polyols, polyester polyols, polycarbonate polyols, poly(meth)acrylate polyols and/or polyurethane polyols which are known per se from the technology of coating, adhesive bonding, printing inks or sealants and which contain no groups which react, with polymerization, with ethylenically unsaturated compounds on exposure to actinic radiation.

Unsaturated hydroxy-functional compounds are, for example, the epoxy acrylates, polyester acrylates, polyether acrylates, urethane acrylates and acrylated polyacrylates which are known in the art of radiation-curing coatings and have an OH number of from 30 to 300 mg KOH/g.

It is additionally possible to use the reactive diluents, already described and known in the art of radiation-curing coatings, as a constituent of d), provided that they contain NCO-reactive groups.

As initiators of component e) for a free-radical polymerization it is possible to employ initiators which can be activated thermally and/or by radiation. Photoinitiators, which are activated by UV or visible light, are preferred in this context. Photoinitiators are compounds known per se, being sold commercially, a distinction being made between unimolecular (type I) and bimolecular (type II) initiators. Suitable (type I) systems are aromatic ketone compounds, e.g. benzophenones in combination with tertiary amines, alkylbenzophenones, 4,4'-bis(dimethylamino)benzophenone (Michler's ketone), anthrone and halogenated benzophenones or mixtures of the types stated. Of further suitability are (type II) initiators such as benzoin and its derivatives, benzil ketals, acylphosphine oxides, 2,4,6-trimethylbenzoyldiphenylphosphine oxide for example, bisacylphosphine oxides, phenylglyoxylic esters, camphorquinone, α-aminoalkylphenones, α,α-dialkoxyacetophenones and α-hydroxyalkylphenones.

The initiators, which are used in amounts between 0.1% and 10% by weight, preferably 0.1% to 5% by weight, based on the weight of the film-forming binder, can be used as an individual substance or else, on account of frequent advantageous synergistic effects, in combination with one another.

Where electron beams are used instead of UV radiation there is no need for a photoinitiator. Electron beams, as is known to the skilled person, are generated by means of thermal emission and accelerated by way of a potential difference. The high-energy electrons then pass through a titanium foil and are guided onto the binders to be cured. The general principles of electron beam curing are described in detail in "Chemistry & Technology of UV & EB Formulations for Coatings, Inks & Paints", Vol. 1, P K T Oldring (Ed.), SITA Technology, London, England, pp. 101-157, 1991.

In the event of thermal curing of the activated double bonds, this can also take place with addition of thermally decomposing free-radical initiators. Suitability is possessed, as is known to the skilled person, by, for example, peroxy compounds such as dialkoxy dicarbonates such as, for example, bis(4-tert-butylcyclohexyl) peroxydicarbonate, dialkyl peroxides such as, for example, dilauryl peroxide, peresters of aromatic or aliphatic acids such as, for example, tert-butyl perbenzoate or tert-amyl peroxy 2-ethylhexanoate, inorganic peroxides such as, for example, ammonium peroxodisulphate, potassium peroxodisulphate, organic peroxides such as, for example, 2,2-bis(tert-butylperoxy)butane, dicumyl peroxide, tert-butyl hydroperoxide or else azo compounds such as 2,2'-azobis[N-(2-propenyl)-2-methylpropionamides], 1-[(cyano-1-methylethyl)azo]formamides, 2,2'-azobis(N-butyl-2-methylpropionamides), 2,2'-azobis(N-cyclohexyl-2-methyl -propionamides), 2,2'-azobis {2-methyl-N-[2-(1-hydroxybutyl)]propionamides }, 2,2'-azobis {2-methyl-N-[2-(1-hydroxybutyl)]propionamides, 2,2'-azobis {2-methyl-N-[1,1-bis(hydroxymethyl)-2-hydroxyethyl] propionamides. Also possible are highly substituted 1,2-diphenylethanes (benzpinacols), such as, for example, 3,4-dimethyl-3,4-diphenylhexane, 1,1,2,2-tetraphenylethane-1,2-diol or else the silylated derivatives thereof.

It is also possible to use a combination of initiators activable by UV light and thermally.

The auxiliaries and additives of component f) include the solvents specified in the context of the process of the invention.

Additionally it is possible for f), in order to increase the weather stability of the cured coating film, to comprise UV absorbers and/or HALS stabilizers as well. Preference is given to the combination. The absorbers ought to have an absorption range of not more than 390 nm, such as triphenyltriazine types (e.g. Tinuvino® 400 and 479 (Ciba Spezialitätenchemie GmbH, Lampertheim, DE)), benzotriazoles such as Tinuvin® 622 (Ciba Spezialitätenchemie GmbH, Lampertheim, DE) or oxalic dianilides (e.g. Sanduvore® 3206

(Clariant, Muttenz, CH)) and are added at 0.5% to 3.5% by weight, based on resin solids. Suitable HALS stabilizers are available commercially (Tinuvin® 292 or Tinuvin® 123 (Ciba Spezialitätenchemie GmbH, Lampertheim, DE) or Sanduvor® 3258 (Clariant, Muttenz, CH). Preferred amounts are 0.5% to 2.5% by weight based on resin solids.

It is likewise possible for f) to comprise pigments, dyes, fillers, flow-control additives and devolatilizing additives.

Additionally it is possible, if necessary, for the catalysts known from polyurethane chemistry for accelerating the NCO/OH reaction to be present in f). These are, for example, tin salts or zinc salts or organotin compounds, tin soaps and/or zinc soaps such as, for example, tin octoate, dibutyltin dilaurate, dibutyltin oxide or tertiary amines such as diazabicyclo[2.2.2]octane (DABCO).

The application of the coating compositions of the invention to the material to be coated takes place with the methods known and customary in coatings technology, such as spraying, knife coating, rolling, pouring, dipping, spin coating, brushing or squirting or by means of printing techniques such as screen, gravure, flexographic or offset printing and also by means of transfer methods.

Suitable substrates are, for example, wood, metal, including in particular metal as used in the applications of wire enameling, coil coating, can coating or container coating, and also plastic, including plastic in the form of films, especially ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM, and UP (abbreviations according to DIN 7728 Part 1), paper, leather, textiles, felt, glass, wood, wood materials, cork, linoleum, inorganically bonded substrates such as wooden boards and fibre cement slabs, electronic assemblies or mineral substrates. It is also possible to coat substrates consisting of a variety of the above-mentioned materials, or to coat already coated substrates such as vehicles, aircraft or boats and also parts thereof, especially vehicle bodies or parts for exterior mounting. It is also possible to apply the coating compositions to a substrate temporarily, then to cure them partly or fully and optionally to detach them again, in order to produce films, for example.

For curing it is possible for solvents present, for example, to be removed entirely or partly by flashing off or other common methods.

Subsequently or simultaneously it is possible for the optionally necessary thermal and photochemical curing operation or operations to be carried out in succession or simultaneously.

If necessary the thermal curing can take place at room temperature or else at elevated temperature, preferably at 40 to 160° C., more preferably at 60 to 130° C., very preferably at 80 to 110° C.

Where photoinitiators are used in e) the radiation cure takes place preferably by exposure to high-energy radiation, in other words UV radiation or daylight, such as light of wavelength 200 to 700 nm. Radiation sources of light or UV light used are, for example, high-pressure or medium-pressure mercury vapour lamps, it being possible for the mercury vapour to have been modified by doping with other elements such as gallium or iron. Lasers, pulsed lamps (known under the designation of UV flashlight lamps), halogen lamps, light-emitting diodes (LED) or excimer emitters are likewise possible. As an inherent part of their design or through the use of special filters and/or reflectors, the emitters may be equipped so that part of the UV spectrum is prevented from being emitted. By way of example, for reasons of occupational hygiene, for example, the radiation assigned to UV-C or to UV-C and UV-B may be filtered out. The emitters may be installed in stationary fashion, so that the material for irradiation is conveyed past the radiation source by means of a mechanical device, or the emitters may be mobile and the material for irradiation may remain stationary in the course of curing. The radiation dose which is normally sufficient for crosslinking in the case of UV curing is situated in the range from 80 to 5000 mJ/cm$^2$.

Irradiation can if desired also be carried out in the absence of oxygen, such as under an inert gas atmosphere or an oxygen-reduced atmosphere. Suitable inert gases are preferably nitrogen, carbon dioxide, noble gases or combustion gases. Irradiation may additionally take place by covering the coating with media transparent to the radiation. Examples of such are, for example, polymeric films, glass or liquids such as water.

Depending on the radiation dose and curing conditions it is possible to vary the type and concentration of any initiator used, in a manner known to the skilled person.

Particular preference is given to carrying out curing using high-pressure mercury lamps in stationary installations. Photoinitiators are then employed at concentrations of from 0.1% to 10% by weight, more preferably from 0.2% to 3.0% by weight, based on the solids of the coating. For curing these coatings it is preferred to use a dose of from 200 to 3000 mJ/cm$^2$, measured in the wavelength range from 200 to 600 nm.

If curing takes place by means of electron beams it is possible to do without photoinitiators. Curing is accomplished by irradiation with high-energy electrons (electron beams, 150 to 300 keV) in accordance with known methods and in the absence of oxygen, such as under an inert gas atmosphere or an oxygen-reduced atmosphere, for example. Suitable inert gases are preferably nitrogen, carbon dioxide, noble gases or combustion gases. Irradiation may also take place by covering the coating with media that are transparent to the radiation. Examples of such media are, for example, polymeric films, glass or liquids such as water.

In the case of use of thermally activable initiators in e), curing is accomplished by increasing the temperature. The thermal energy may in this case be introduced into the coating by means of radiation, thermal conduction and/or convection, it being customary to employ the infrared lamps, near-infrared lamps and/or ovens that are conventional in coatings technology.

The applied film thicknesses (prior to curing) are typically between 0.5 and 5000 μm, preferably between 5 and 1000 μm, more preferably between 15 and 200 μm. Where solvents are used, it is removed after application and before curing, by the customary methods.

EXAMPLES

All percentages are by weight unless indicated otherwise.

The determination of the NCO contents in % was undertaken by back-titration with 0.1 mol/l hydrochloric acid following reaction with butylamine, on the basis of DIN EN ISO 11909.

The viscosity measurements were carried out with a plate-plate rotational viscometer RotoVisko 1 from Haake, DE in accordance with ISO/DIS 3219:1990.

The ambient temperature of 23° C. prevailing at the time when the experiments were conducted is referred to as RT.

Oxyester T1136®: polyester of adipic acid, hexanediol and neopentyl glycol, commercial product of Degussa AG, Marl Desmophen® 2028fl: polyester of adipic acid, hexanediol and neopentyl glycol, commercial product of Bayer MaterialScience AG, Leverkusen Desmophen® 1652: polyester of adipic acid, butanediol, monoethylene glycol and diethylene glycol, commercial product of Bayer MaterialScience AG, Leverkusen Acclaims 2200: polyoxypropylene glycol (Mn=approx. 2000 g/mol), commercial product of Bayer MaterialScience AG, Leverkusen Preparation of Choline 2-ethylhexanoate In a 1000-ml glass flask with stirring apparatus 83 g of sodium 2-ethylhexanoate were dissolved at RT in 600 ml of methanol. Subsequently 69.8 g of choline chloride were added in portions and the mixture was stirred at room temperature for a further 10 hours. The precipitate formed was filtered off and the solution was concentrated to roughly a third under reduced pressure on a rotary evaporator until again a precipitate formed. Dilution took place with about 400 ml of acetone, followed by filtration again, and the solvent was again stripped off under reduced pressure. The residue which remained was again taken up in about 400 ml of acetone, followed by filtration, and the solvent was stripped off. This gave 117 g of crystallization-stable, liquid product which was used in this form as an allophanatization catalyst.

Example 1

Inventive Allophanate-containing Binder Based on a Polyester

A 1000-ml four-necked glass flask with reflux condenser, heatable oil bath, mechanical stirrer, air traversal (l/h), internal thermometer and dropping funnel was charged with 163.27 g of hexamethylene diisocyanate (Desmodur® H, Bayer MaterialScience, Leverkusen) and 100 mg of phenothiazine and this initial charge was heated to 70° C. 250 mg of dibutyltin dilaurate (Desmorapid Z, Bayer MaterialScience, Leverkusen) were added and 147.23 g of hydroxypropyl acrylate and then 187.15 g of Oxyester T1136® were added dropwise at a rate such that the temperature did not exceed 80° C. Stirring was then continued until the theoretical NCO value of 4.09% was reached. Subsequently the temperature was raised to 80° C. and over 2 hours 2.0 g of choline 2-ethylhexanoate were slowly metered in. After about more than half the time a slight exotherm was noted. Despite this, metering was completed, and was followed by stirring for an additional two hours. This gave a colourless resin having a residual NCO content of 0.05% and a viscosity of 216,000 mPas (23° C.).

Example 2

Inventive Allophanate-containing Binder Based on a Polyester

A 1000-ml four-necked glass flask with reflux condenser, heatable oil bath, mechanical stirrer, air traversal (l/h), internal thermometer and dropping funnel was charged with 108.66 g of hexamethylene diisocyanate (Desmodur® H, Bayer MaterialScience, Leverkusen) and 100 mg of phenothiazine and this initial charge was heated to 70° C. 250 mg of dibutyltin dilaurate (Desmorapid Z, Bayer MaterialScience, Leverkusen) were added and 97.99 g of hydroxypropyl acrylate and then 215.75 g of Desmophen® 2028fl were added dropwise at a rate such that the temperature did not exceed 80° C. Stirring was then continued until the theoretical NCO value of 3.20% was reached. Subsequently the temperature was raised to 80° C. and over 2 hours 2.0 g of choline 2-ethylhexanoate were slowly metered in. After about more than half the time a slight exotherm was noted. Despite this, metering was completed, and was followed by stirring for an additional two hours. Subsequently 75 g of a reactive diluent (Laromer® 8887, BASF AG, Ludwigshafen) and 250 mg of stabilizer (Irganox® 1076, Ciba Spezialitätenchemie, Basel) were mixed in and the mixture was homogenized. This gave a colourless resin having no residual NCO content and a viscosity of 64,500 mPas (23° C.).

Example 3

Inventive Allophanate-containing Binder Based on a Polyester

A 1000-ml four-necked glass flask with reflux condenser, heatable oil bath, mechanical stirrer, air traversal (l/h), internal thermometer and dropping funnel was charged with 168.85 g of hexamethylene diisocyanate (Desmodur® H, Bayer MaterialScience, Leverkusen) and 160 mg of phenothiazine and this initial charge was heated to 70° C. 400 mg of dibutyltin dilaurate (Desmorapid Z, Bayer MaterialScience, Leverkusen) were added and 152.26 g of hydroxypropyl acrylate and then 354.72 g of Desmophen® 1652 were added dropwise at a rate such that the temperature did not exceed 80° C. Stirring was then continued until the theoretical NCO value of 3.11% was reached. Subsequently the temperature was raised to 80° C. and over 4 hours 3.2 g of choline 2-ethylhexanoate were slowly metered in. After about more than half the time a slight exotherm was noted. Despite this, metering was completed, and was followed by stirring for an additional two hours. Subsequently 120 g of a reactive diluent (Laromer® 8887, BASF AG, Ludwigshafen) and 400 mg of stabilizer (Irganox® 1076, Ciba Spezialitätenchemie, Basel) were mixed in and the mixture was homogenized.

This gave a colourless resin having a residual NCO content of 0.0% and a viscosity of 61,000 mPas (23° C.).

Example 4

Inventive Allophanate-containing binder Based on a Polyether

A 1000-ml four-necked glass flask with reflux condenser, heatable oil bath, mechanical stirrer, air traversal (l/h), internal thermometer and dropping funnel was charged with 128.14 g of hexamethylene diisocyanate (Desmodur® H, Bayer MaterialScience, Leverkusen) and 100 mg of phenothiazine and this initial charge was heated to 70° C. 250 mg of dibutyltin dilaurate (Desmorapid Z, Bayer MaterialScience, Leverkusen) were added and 115.55 g of hydroxypropyl acrylate and then 253.96 g of Acclaim® 2200 were added dropwise at a rate such that the temperature did not exceed 80° C. Stirring was then continued until the theoretical NCO value of 3.21% was reached. Subsequently the temperature was raised to 80° C. and over 4 hours 2.0 g of choline 2-ethylhexanoate were slowly metered in. After about more than half the time a slight exotherm was noted. Despite this, metering was completed, and was followed by stirring for an additional two hours. This gave a colourless resin having a residual NCO content of 0% and a viscosity of 48,000 mPas (23° C.).

Example 5

Inventive Allophanate-containing Binder Based on a Polyester with Monoisocyanate Modification A 1000-ml four-necked glass flask with reflux condenser, heatable oil bath, mechanical stirrer, air traversal (l/h), internal thermometer and dropping funnel was charged with 148.78 g of hexamethylene diisocyanate (Desmodur® H, Bayer MaterialScience, Leverkusen) and 100 mg of phenothiazine and this initial charge was heated to 70° C. 250 mg of dibutyltin dilaurate (Desmorapid Z, Bayer Material-Science, Leverkusen) were added and 119.84 g of hydroxyethyl acrylate and then 170.54 g of Oxyester T11360® were added dropwise at a rate such that the temperature did not exceed 80° C. Stirring was then continued until the theoretical NCO value of 4.22% was reached. Subsequently 58.48 g of butyl isocyanate (Lanxess, Leverkusen, DE, hydrolysable chlorine content approximately 100 ppm) were added, the temperature was raised to 80° C., and over 4 hours 2.0 g of choline 2-ethylhexanoate were slowly metered in. After about more than half the time a distinct exotherm was noted. Despite this, metering was completed, and was followed by stirring for an additional two hours. This gave a colourless resin having a residual NCO content of 0.0% and a viscosity of 75,000 mPas (23° C.).

Comparative Example 1

Non-Inventive Allophanate-containing Binder without Diol

A 500-ml four-necked glass flask with reflux condenser, heatable oil bath, mechanical stirrer, air traversal (l/h), internal thermometer and dropping funnel was charged with 231.16 g of hexamethylene diisocyanate (Desmodur® H, Bayer MaterialScience, Leverkusen) and 50 mg of phenothiazine and this initial charge was heated to 70° C. 25 mg of dibutyltin dilaurate (Desmorapid Z, Bayer MaterialScience, Leverkusen) were added and 268.01 g of hydroxypropyl acrylate were added dropwise at a rate such that the temperature did not exceed 80° C. Stirring was then continued until the theoretical NCO value of 5.77% was reached. Subsequently the temperature was raised to 80° C. and 0.75 g of choline 2-ethylhexanoate were metered in slowly over 6 hours. After about more than half the time a distinct exotherm was noted, which necessitated cooling of the batch. Despite this, metering was completed, and was followed by stirring for an additional two hours. This gave a colourless resin having a residual NCO content of 0.1% and a viscosity of 75,400 mPas (23° C.).

Comparative Example 2

Non-Inventive Allophanate-containing Binder without Enhanced Functionality

A 1000-ml four-necked glass flask with reflux condenser, heatable oil bath, mechanical stirrer, air traversal (l/h), internal thermometer and dropping funnel was charged with 111.67 g of hexamethylene diisocyanate (Desmodur® H, Bayer MaterialScience, Leverkusen, DE), 0.15 g of phenothiazine and 0.375 g of dibutyltin dilaurate (Desmorapid Z, Bayer MaterialScience, Leverkusen) and this initial charge was heated to 70° C. Then 57.54 g of hydroxypropyl acrylate and subsequently 491.72 g of Oxyester T1136® were added dropwise at a rate such that the temperature did not exceed 80° C., and the mixture was stirred until residual NCO was no longer detectable. Subsequently 87.79 g of butyl isocyanate (Lanxess, Leverkusen, DE, hydrolysable chlorine content approximately 100 ppm) were added, the temperature was raised to 80° C., and 2.25 g of choline 2-ethylhexanoate were metered in slowly over 6 hours. After about more than half the time a distinct exotherm was noted, which necessitated cooling of the batch. Despite this, metering was completed, and was followed by stirring for an additional two hours. The colourless resin also had an NCO content of 0.46%, which was consumed by reaction with methanol, of which 2.63 g were added, and by stirring at 60° C. over two hours. This gave a colourless resin having a residual NCO content of 0% and a viscosity of 137,000 mPas (23° C.).

Performance Examples

Inventive allophanate-containing binders were tested with the allophanate-containing binders of the comparative examples for suitability in electron-beam-curing coil-coating topcoat materials. Substrates were steel panels from Bonder (Gardobond® WH 60 OHC) which had been coated with a standard 1-component polyurethane coil-coating primer in a coat thickness of 12 μm. The cured primers were sanded with sandpaper (800 grade), before the topcoat materials indicated in the table, respectively, were applied using a spiral-wound coating bar (Handcoater 3) and cured using an electron beam source (from ESI, 50 kGy). After 24 hours, the cured coatings were tested for their elasticity/adhesion (Erichsen cupping: slow pressing of a hemisphere from the reverse side of the coated panel, result reported as mm until the coating breaks, maximum value 9 mm; T-bend test EN 13523-7) and for solvent resistance with methyl ethyl ketone (double rubs with an impregnated cotton pad under an applied pressure of approximately 1 kg; number of double rubs until a change in the surface became visible).

TABLE 1

Topcoat formulations

| | Example: | | | | | | | | |
|---|---|---|---|---|---|---|---|---|---|
| | 6 | 7 | 8 | 9 | 10C | 11C | 12C | 13C | 14C |
| Ex. 1 | 40 | — | 40 | 40 | — | — | — | — | — |
| Ex. 5 | — | 40 | — | — | — | — | — | — | — |
| Comp. Ex. 2 | — | — | — | — | 40 | — | 20 | 20 | 20 |
| Comp. Ex. 1 | — | — | — | — | — | 40 | 20 | 20 | 20 |
| CMFA | 55 | 55 | 55 | 55 | 55 | 55 | 55 | 25 | 55 |

TABLE 1-continued

Topcoat formulations

| | Example: | | | | | | | | |
|---|---|---|---|---|---|---|---|---|---|
| | 6 | 7 | 8 | 9 | 10C | 11C | 12C | 13C | 14C |
| HDDA | — | — | — | — | — | — | — | 30 | — |
| Ebecryl 168 | 5 | 5 | 5 | 5 | 5 | 5 | 5 | 5 | 5 |
| Perenol S71UV | 0.2 | 0.2 | 0.2 | 0.2 | 0.2 | 0.2 | 0.2 | 0.2 | 0.2 |
| TiO$_2$ | — | — | 50 | 70 | — | — | — | — | 50 |

CMFA—cyclic trimethylolformal monoacrylate
HDDA—hexanediol diacrylate
Ebecryl ® 168—acidic methacrylate adhesion promoter (Cytec, Drogenbos, BE)
Perenol ® S71UV—flow-control and wetting additive (Cognis, Düsseldorf, DE)
TiO$_2$—titanium dioxide pigment R-KB-6 (Kerr-McGee, Krefeld, DE)

TABLE 2

Tests on the cured topcoat formulations

| | Example: | | | | | | | | |
|---|---|---|---|---|---|---|---|---|---|
| | 6 | 7 | 8 | 9 | 10C | 11C | 12C | 13C | 14C |
| Film thickness [μm] | 20 | 20 | 22 | 20 | 22 | 20 | 23 | 22 | 21 |
| Surface curing | OK | OK | OK | OK | OK | OK | OK | OK | OK |
| Cross-hatch adhesion 0-5 | 0 | 0 | 0 | 0 | 0 | 0 | 0 | 0 | 0 |
| Erichsen cupping [mm] | 9 | >9 | >9 | >9 | >9 | 3 | >9 | 8 | >9 |
| T-bend 0-2.5 | 0.5 | 1.0 | 1.0 | 1.0 | 1.5 | >2.5 | 1.5 | 2.5 | 1.5 |
| Solvent (MEK) [double rubs] | >100 | >100 | >100 | >100 | 20 | >100 | 60 | 80 | 50 |

The Inventive Examples 6 and 7 show that with the prepolymers of the invention it is easy to formulate topcoat materials for coil-coating applications that combine very good solvent resistance with good elasticity in the T-bend test. As shown in Examples 8 and 9, these formulations can also be highly pigmented, without substantial deteriorations in elasticity and resistance.

In the Comparative Examples 10C-13C it is shown that these properties cannot be set using the allophanate-containing urethane acrylates known to date. Although formulation 10C does almost meet the elasticity requirement (T-bend), the resistances to MEK are inadequate. Formulation 11C, based on the more highly functional allophanate of Comparative Example 1, meets the requirements for solvent resistance, but also exhibits an entirely inadequate elasticity. The combination of the binders from Comparative Examples 1 and 2 in Example 12C is still significantly inferior in terms of the sum of the properties to the formulations of the invention, and this situation is not altered by producing the formulation with difunctional reactive diluent, in Example 13C. If formulation 12C is pigmented (14C), in the same way as formulation 8, then elasticity and resistance are significantly poorer in comparison to formulation 8.

Example 15

The product from Example 1 was mixed with 3% by weight of Darocur® 1173 (Ciba Spezialitätenchemie, Basel, CH) photoinitiator and 0.9% by weight of Byk® 306 (Byk-Chemie, Wesel, DE) flow-control agent and the mixture was adjusted to spray viscosity (25 s flow time from the 4 mm cup) using butyl acetate and applied by spraying to polycarbonate sheets (dry coat thickness approximately 25 μm). The coating was freed from the solvent in a forced-air oven at 60° C. for 5 minutes and then cured using a UV lamp (mercury, 80 W/cm lamp length) with a belt speed of 30 m/min (dose: 133 mJ/cm$^2$).

The cured coatings were solvent-resistant (>100 double rubs MEK) and exhibited a pendulum hardness of 103 s. The adhesion after cross-cutting was assessed as being 0 both before and after one week's water storage (unchanged).

Example 15 shows that with the prepolymers of the invention it is also possible to generate highly reactive and resistant coatings on plastics, these coatings adhering well.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Process for preparing radiation-curing allophanate-containing prepolymers having residual monomer contents of less than 0.5% by weight and an NCO content of less than 1% by weight, wherein
   A) diisocyanates,
   B) hydroxy-functional compounds which contain groups which react, with polymerization, with ethylenically unsaturated compounds on exposure to actinic radiation, and
   C) polyester, polyether or polycarbonate polyols having a functionality of 1.9 to 2.1 and a number-average molecular weight ($M_n$) of 1000 to 4000 g/mol
   D) optionally in the presence of a catalyst are used to form NCO-group-containing prepolymers having radiation-curing groups, which are subsequently reacted
   E) optionally after addition of monofunctional isocyanates in the presence
   F) of an allophanatization catalyst to give allophanate-containing prepolymers, the ratio of NCO groups of the compounds from A) to the OH groups of the compounds from B) and C) being 1.45:1.0 to 1.1 :1.0 and the ratio of the OH groups from B) to the OH groups from C) being 8.0:1 to 1.5:1.

2. Process for preparing radiation-curing allophanate-containing prepolymers according to claim 1, wherein in component A) hexamethylene diisocyanate (HDI), isophorone diisocyanate (IPDI) and/or 4,4'-diisocyanatodicyclohexylmethane are used.

3. Process for preparing radiation-curing allophanate-containing prepolymers according to claim 1, wherein in component B) hydroxyethyl (meth)acrylate, hydroxypropyl (meth)acrylate and/or hydroxybutyl (meth)acrylate are used.

4. Process for preparing radiation-curing allophanate-containing prepolymers according to claim 1, wherein in component C) polyester diols or polyether diols having a functionality of 1.9 to 2.1 and an average molecular weight ($M_n$) of 1000 to 4000 g/mol are used.

5. Process for preparing radiation-curing allophanate-containing prepolymers according to claim 1, wherein the ratio of NCO groups of the compounds from A) to the OH groups of the compounds from B) and C) is 1.35 :1.0 to 1.3 :1.0.

6. Process for preparing radiation-curing allophanate-containing prepolymers according to claim 1, wherein the ratio of the OH groups from B) to the OH groups from C)is 5.0: 1 to 2.0: 1.

7. Process for preparing radiation-curing allophanate-containing prepolymers according to claim 1, wherein the allophanatization is carried out until the end product has an NCO content of below 0.3 per cent by weight.

8. Radiation-curing allophanate-containing prepolymers prepared by the process according to claim 1.

9. Coatings, coating materials, adhesives, sealants and/or printing inks comprising the radiation-curing allophanate-containing prepolymers according to claim 8.

10. Binders for coating metals and/or plastics comprising the radiation-curing allophanate-containing prepolymers according to claim 8.

11. Coating compositions comprising
a) one or more of the radiation-curing allophanate-containing prepolymers according to claim 8,
b) optionally one or more polyisocyanates containing free or blocked isocyanate groups, which are free from groups which react, with polymerization, with ethylenically unsaturated compounds on exposure to actinic radiation,
c) optionally other compounds, different from those of a), which contain groups which react, with polymerization, with ethylenically unsaturated compounds on exposure to actinic radiation, and optionally contain free or blocked NCO groups,
d) optionally one or more isocyanate-reactive compounds containing active hydrogen,
e) optionally initiators and
f) optionally auxiliaries and additives.

12. Substrates coated with coatings obtained using radiation-curing allophanate-containing prepolyrners according to claim 8.

* * * * *